United States Patent
Xu et al.

(10) Patent No.: US 12,163,429 B1
(45) Date of Patent: Dec. 10, 2024

(54) METHOD OF BUFFER LAYER WITH CRITICAL DEFORMATION OF TUNNEL INITIAL SUPPORT AS CONTROL TARGET

(71) Applicants: Research Institute of Highway Ministry of Transport, Beijing (CN); The 5th Engineering Co., Ltd. of China Railway 11th Bureau Group, Chongqing (CN)

(72) Inventors: Chongbang Xu, Beijing (CN); Ziteng Zheng, Beijing (CN); Ju Du, Chongqing (CN); Hao Wang, Beijing (CN)

(73) Assignees: RESEARCH INSTITUTE OF HIGHWAY MINISTRY OF TRANSPORT, Beijing (CN); THE 5TH ENGINEERING CO., LTD OF CHINA RAILWAY 11TH BUREAU GROUP, Chongqiang (CN)

(*) Notice: Subject to any disclaimer, the term of this patent is extended or adjusted under 35 U.S.C. 154(b) by 0 days.

(21) Appl. No.: 18/396,680

(22) Filed: Dec. 26, 2023

(30) Foreign Application Priority Data

Jul. 20, 2023 (CN) .......................... 202310891832.6

(51) Int. Cl.
*E21D 9/14* (2006.01)
*G06F 30/20* (2020.01)

(52) U.S. Cl.
CPC .............. *E21D 9/14* (2013.01); *G06F 30/20* (2020.01)

(58) Field of Classification Search
CPC .................................. E21D 9/14; G06F 30/20

USPC ............................................................. 703/1
See application file for complete search history.

(56) References Cited

U.S. PATENT DOCUMENTS

2023/0349799 A1* 11/2023 Chen .......................... G01N 3/02

FOREIGN PATENT DOCUMENTS

| CN | 104265323 A | * | 1/2015 | ............. E21D 11/04 |
| CN | 104634646 A | * | 5/2015 | |
| CN | 206397527 U | * | 8/2017 | |
| CN | 109026016 A | * | 12/2018 | ............. E21D 11/10 |
| CN | 110750820 A | * | 2/2020 | |

(Continued)

*Primary Examiner* — Suresh Memula
(74) *Attorney, Agent, or Firm* — Juan Carlos A. Marquez; Marquez IP Law Office, PLLC

(57) ABSTRACT

The present disclosure relates to the technical field of tunnel construction, in particular to a design method of a buffer layer with critical deformation of a tunnel initial support as a control target. The method includes the following steps: (1) establishing a mechanical model and calculating an ultimate bearing capacity of the tunnel initial support during critical damage based on a cusp catastrophe theory; (2) determining a critical deformation value of the tunnel initial support under the ultimate bearing capacity; (3) establishing a yielding control target of a tunnel buffer layer; (4) determining a performance index of the buffer layer according to the control target, and calculating corresponding index parameters. Compared with the prior art, the method has the following beneficial effects. The method aims to put forward the critical deformation value of the tunnel initial support under the ultimate bearing capacity, obtain an optimal yielding design parameters of the buffer layer by taking a compression and load transfer mode of the tunnel buffer layer as a link, and give a calculation method.

6 Claims, 2 Drawing Sheets

(56) References Cited

FOREIGN PATENT DOCUMENTS

| | | | | | |
|---|---|---|---|---|---|
| CN | 111305097 | A | * | 6/2020 | |
| CN | 211342930 | U | * | 8/2020 | |
| CN | 111967080 | A | * | 11/2020 | |
| CN | 113338994 | A | * | 9/2021 | |
| CN | 214303850 | U | * | 9/2021 | |
| CN | 114329701 | A | * | 4/2022 | |
| CN | 114635720 | A | * | 6/2022 | |
| CN | 114996825 | A | * | 9/2022 | |
| CN | 115596466 | A | * | 1/2023 | |
| CN | 110210069 | B | * | 4/2023 | ......... G06F 17/5009 |
| CN | 116066515 | A | * | 5/2023 | |
| CN | 116429592 | B | | 8/2023 | |
| CN | 116611156 | A | * | 8/2023 | |
| CN | 116611156 | B | | 8/2023 | |
| CN | 116167131 | B | * | 9/2023 | |
| CN | 117077244 | A | * | 11/2023 | |
| CN | 117235968 | A | * | 12/2023 | |
| JP | 2007205163 | A | * | 8/2007 | |
| WO | WO-2018086085 | A1 | * | 5/2018 | ............. E21D 11/00 |

* cited by examiner

METHOD OF BUFFER LAYER WITH CRITICAL DEFORMATION OF TUNNEL INITIAL SUPPORT AS CONTROL TARGET

TECHNICAL FIELD

The present disclosure relates to the technical field of tunnel construction, in particular to a design method of a buffer layer with critical deformation of a tunnel initial support as a control target.

BACKGROUND

China is a vast country with rich and diverse landform features. Some tunnel sites are inevitably in bad geology, in which the most common ones are expansive rocks, soft rocks, high ground strain and loess tunnels. In response to such tunnel construction engineering, researchers have designed a variety of construction support methods, which can better guarantee the overall stability of the tunnel according to local conditions. The yielding technology amount of a buffer layer is the most discussed in recent years. This technology can release the deformation amount of surrounding rocks by using its own compression technology, so that the initial support can still play a supporting role under a large load, thus still providing a constant support force while yielding. Different from the traditional New Austrian Tunneling Method construction technology, this technology is widely used in a tunnel composite lining interlayer with large deformation disaster of tunnel surrounding rocks.

With the continuous maturity of the yielding technology of a tunnel buffer layer, the existing research direction has changed from how to construct at first to how to give full play to the optimal yielding effect of the buffer layer, and how to reduce the waste of engineering materials so that the buffer layer reaches the optimal engineering design parameters and the balance between engineering safety and stability and construction cost is achieved on the premise of giving full play to the maximum yielding capacity of the buffer layer and ensuring the overall safety and stability of the tunnel. However, there is no corresponding technical research in the existing buffer layer yielding technology.

Therefore, in view of the existing problems, it is not only of urgent research value, but also of good economic benefit and engineering application potential to develop a buffer layer design method with a critical deformation value under an ultimate bearing capacity of a tunnel initial support as a control target, which is the power and foundation for the completion of the present disclosure.

SUMMARY

In order to overcome the shortcomings of the prior art pointed out above, the present inventors have conducted in-depth research on this, and have made the present disclosure after paying a lot of creative work.

Specifically, the technical problem to be solved by the present disclosure is to provide a design method of a buffer layer with critical deformation of a tunnel initial support as a control target, which can achieve the optimal yielding effect of the buffer layer on the premise of meeting the safety of a tunnel initial support structure, reduce the engineering cost of providing the buffer layer to a certain extent, and provide theoretical basis and technical support for safe, green and efficient tunnel construction.

In order to achieve the above purpose, the present disclosure provides the following technical scheme.

A design method of a buffer layer with critical deformation of a tunnel initial support as a control target is provided, wherein the method includes the following steps:

(1) establishing a mechanical model and calculating an ultimate bearing capacity of the tunnel initial support during critical damage based on a cusp catastrophe theory;

(2) determining a critical deformation value of the tunnel initial support under the ultimate bearing capacity;

(3) establishing a yielding control target of a tunnel buffer layer;

(4) determining a performance index of the buffer layer according to the control target, and calculating corresponding index parameters.

In the present disclosure, as an improvement, the Step (1) includes:

generalizing a tunnel in a longitudinal unit length into a linear model with the tunnel as an object;

calculating variation of potential energy in the model;

obtaining a function expression in the state of critical catastrophe instability of the tunnel initial support in combination with the cusp catastrophe theory.

considering mechanical and design parameters of the tunnel initial support to obtain the ultimate bearing capacity of the tunnel initial support.

In the present disclosure, as an improvement, the yielding control target of the buffer layer is the relationship between a critical deformation value $\omega_{max}$ of the tunnel initial support and a maximum compression deformation amount $HD_{max}$ of the tunnel buffer layer.

In the present disclosure, as an improvement, the performance indexes of the buffer layer in the Step (4) include a thickness H' of the buffer layer and the maximum compression amount $HD_{max}$ of the buffer layer.

In the present disclosure, as an improvement, the function expression in the state of critical catastrophe instability of the tunnel initial support is calculated as follows:

(1) a total system potential energy V(x) is a sum of bending strain energy $V_1$, system potential energy variation $V_2$ and external load work $V_3$ of the tunnel initial support:

$$V(x) = V_1 + V_2 + V_3;$$

(2) the bending strain energy $V_1$, the system potential energy variation $V_2$ and the external load work $V_3$ of the tunnel initial support are calculated, respectively;

(3) the calculation relationship among the bending strain energy, the system potential energy variation and the external load work is substituted into an expression of the total system potential energy to obtain a potential function V:

$$V = V_1 - V_2 - V_3;$$

(4) based on the cusp catastrophe theory, a standard form and a bifurcation set equation of the potential function of a tunnel initial support model are obtained;

(5) when a control variable satisfies the bifurcation set equation, the critical catastrophe instability of the tunnel initial support system occurs, and the function expression in the state of critical catastrophe instability of the tunnel initial support is obtained.

In the present disclosure, as an improvement, the calculation formula of the critical deformation value of the tunnel initial support under the ultimate bearing capacity is as follows:

$$\omega = \frac{qL^4}{384EI};$$

the yielding control target of the buffer layer is that the critical deformation value when the initial support of tunnel reaches the ultimate bearing capacity of catastrophe damage is not greater than the maximum compression deformation amount of the tunnel buffer layer, that is:

$\omega_{max} \leq HD_{max}$.

In the present disclosure, as an improvement, the thickness H' of the tunnel buffer layer is calculated as follows:

$$H' = \frac{\omega_{max}E'}{q_{max}};$$

where $\omega_{max}$ is a critical deformation value of the tunnel initial support under the ultimate bearing capacity, $q_{max}$ is an ultimate bearing capacity, and E' is an elasticity modulus of the buffer layer.

Compared with the prior art, the present disclosure has the following beneficial effects.

(1) The method aims to put forward the critical deformation value of the tunnel initial support under the ultimate bearing capacity, obtain an optimal yielding design parameters of the buffer layer by taking a compression and load transfer mode of the tunnel buffer layer as a link, and give a calculation method.

(2) This method obtains the optimal yielding design of the buffer layer through calculation, so as to give full play to the yield effect of the buffer layer, avoid the waste of engineering materials resulted from a thick buffer layer, improve the overall cost of the engineering, and avoid the lining deformation resulted from a thin buffer layer which brings hidden dangers to the safety of the tunnel, save engineering materials and achieve the corresponding yielding effect on the premise of ensuring the safety and stability of the tunnel.

BRIEF DESCRIPTION OF THE DRAWINGS

In order to explain the specific embodiment of the present disclosure or the technical scheme in the prior art more clearly, the drawings needed in the description of the specific embodiment or the prior art will be briefly introduced hereinafter. In all drawings, like elements or parts are generally identified by like reference numerals. In the drawings, elements or parts are not necessarily drawn to actual scale.

DETAILED DESCRIPTION OF THE EMBODIMENTS

Figure 1:
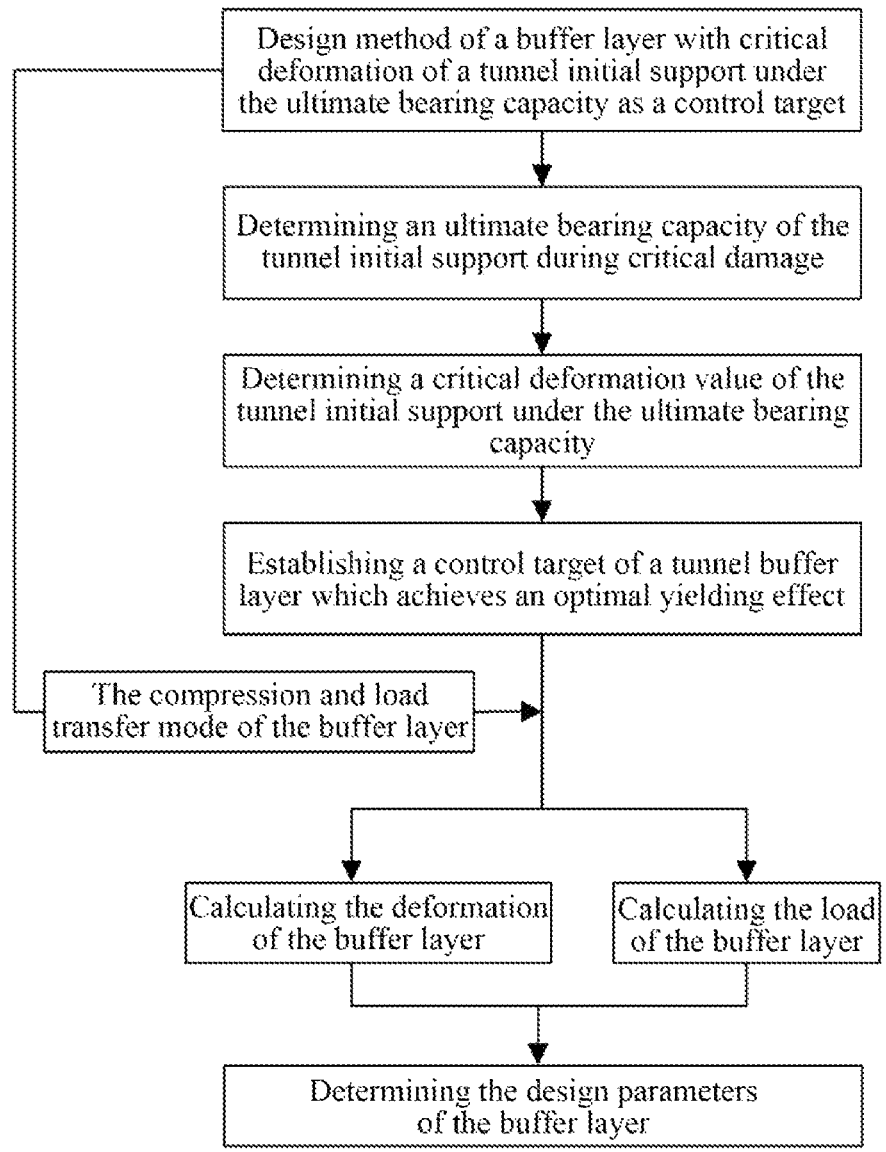
FIG. 1 is a schematic flow chart of a design method according to the present disclosure.
Figure 2:
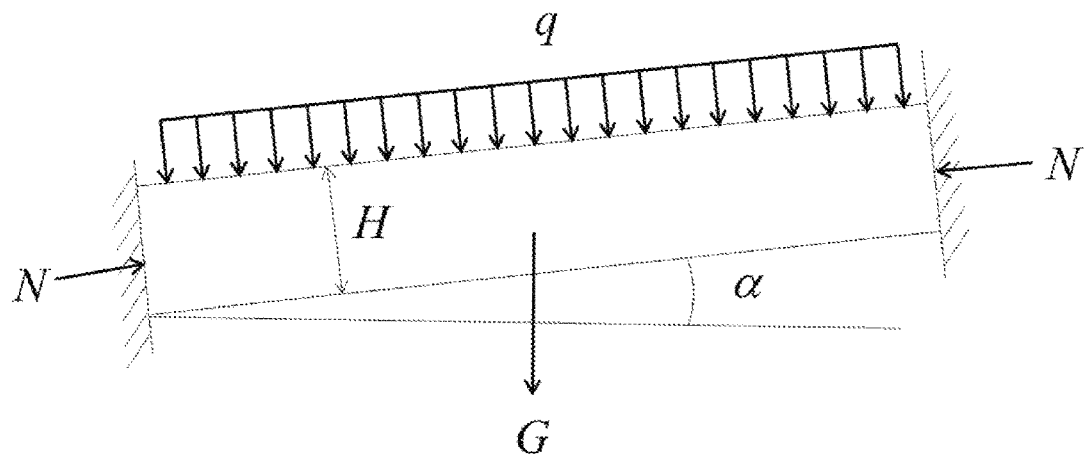
FIG. 2 is a mechanical model diagram of an initial support section of an interception tunnel according to the present disclosure.
Figure 3:
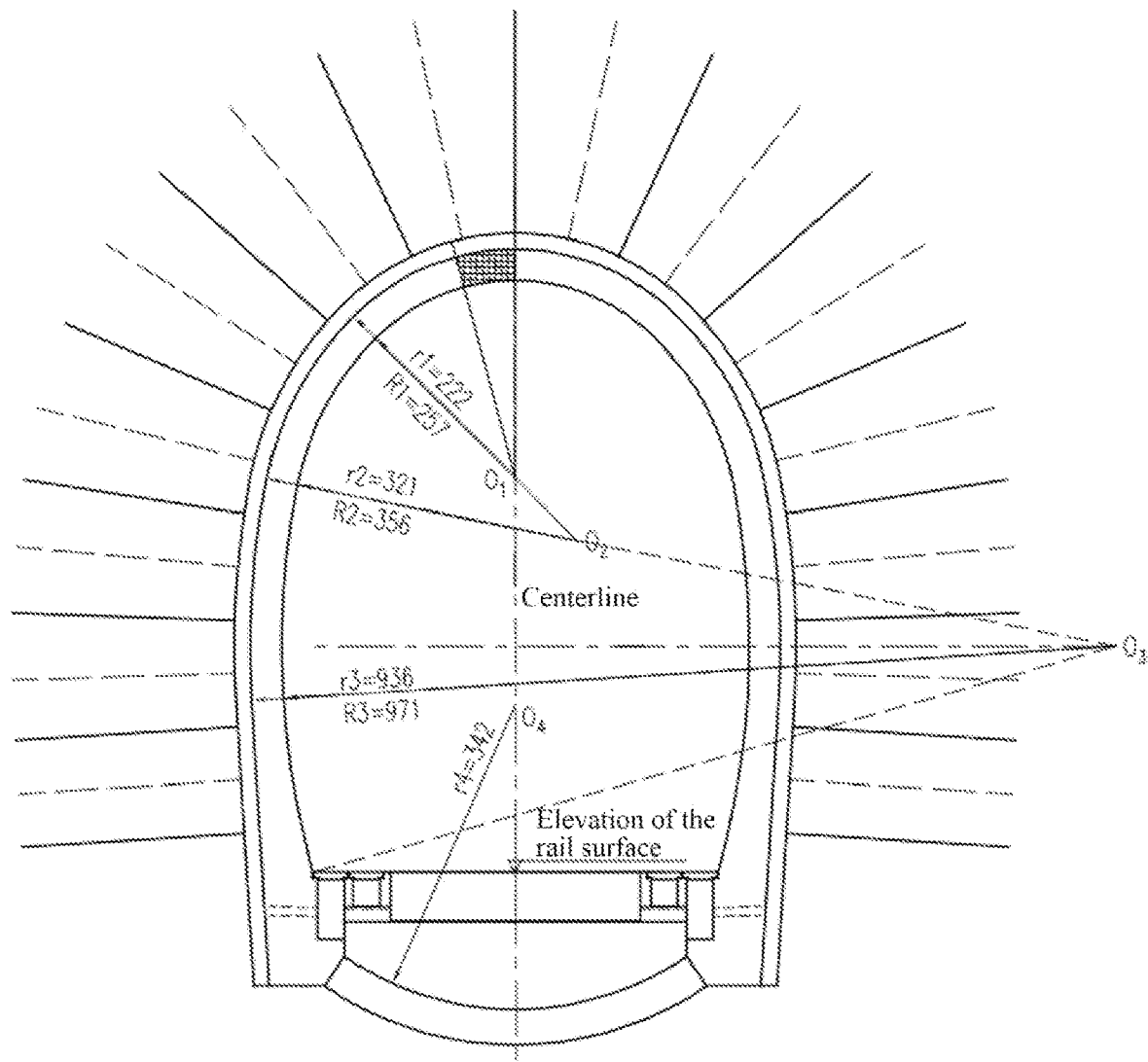
FIG. 3 is a schematic sectional diagram of a lining structure according to an embodiment of the present disclosure.

Hereinafter, embodiments of the technical scheme of the present disclosure will be described in detail with reference to the attached drawings. The following embodiments are only used to explain the technical scheme of the present disclosure more clearly. Therefore, the embodiments are only used as examples, and cannot be used to limit the scope of protection of the present disclosure.

The present disclosure a design method of a buffer layer with critical deformation of a tunnel initial support as a control target, wherein the method includes the following steps:

(1) establishing a mechanical model and calculating an ultimate bearing capacity of the tunnel initial support during critical damage based on a cusp catastrophe theory;

(2) determining a critical deformation value of the tunnel initial support under the ultimate bearing capacity;

(3) establishing a yielding control target of a tunnel buffer layer;

(4) determining a performance index of the buffer layer according to the control target, and calculating corresponding index parameters.

Establishing a mechanical model in Step (1) includes the following manners.

1) the longitudinal unit length of the tunnel is taken as the research object of generalization, wherein the cross section of the taken tunnel is in the interval section of 30 degrees of a vault. The tunnel centerline is taken as the symmetry axis, and one side of the symmetry axis is taken to establish a generalized mechanical model.

2) The taken arc-shaped interval section is simplified into a straight line, and the generalized model parameters are determined, including a length L, an inclination angle α, a thickness H of the initial support, an elasticity modulus E of initial support material, an overlying load q of the tunnel, a bulk density γ of tunnel initial support material, a dead load G=γHL, and an axial force N at both ends of the vault. When the tunnel is a non-over-buried tunnel, the axial force N has little influence on the potential function and can be ignored.

After generalizing the model, the variation of potential energy in the model is calculated, and a total system potential energy V(x) is a sum of a changing amount of strain energy of the tunnel initial support structure, that is, bending strain energy, system potential energy variation and external load work:

$$V(x) = V_1 + V_2 + V_3; \qquad (1)$$

where: $V_1$—bending strain energy; $V_2$—system potential energy variation; $V_3$—external load work.

The bending strain energy, the system potential energy variation and the external load work of the initial support are calculated, respectively.

The calculation of the bending strain energy $V_1$ of the initial support includes the following step.

According to the basic mechanical analysis, the deflection curve equation of the initial support beam model is:

$$y(x) = \frac{\omega}{2}\left(1 - \cos\frac{2\pi x}{L}\right) \qquad (2)$$

where:

ω—the deflection of the midpoint of the initial support interception interval;

x—the distance to the left endpoint of the interception initial support.

Furthermore, it can be known from elastic mechanics that the bending strain energy of the tunnel initial support is:

$$V_1 = \frac{1}{2}\int_0^L M(x)d\varphi \quad (3)$$

where:
M(x)—the bending moment of the initial support of the tunnel at x;
dφ—the angle at which the tangent of the beam deflection curve changes.
The expression is:

$$\begin{cases} M(x) = EIy'' \\ d\varphi = \dfrac{ds}{\rho} = \dfrac{M(x)}{EI}ds \\ ds = \sqrt{1+(y')^2}\,dx \end{cases} \quad (4)$$

where:
E—the elasticity modulus of the initial support material;
I—the moment of inertia of the initial support section.
Formula (4) is substituted into Formula (3), and ds performs Taylor expansion, ignoring the infinitesimal quantity of a higher order:

$$V_1 = \frac{1}{2}\int_0^L EI(y'')^2 ds = \frac{EI\pi^6}{8L^5}\omega^4 + \frac{EI\pi^4}{L^3}\omega^2 \quad (5)$$

The calculation formula of the system potential energy variation $V_2$ is as follows:

$$V_2 = \int_0^L \gamma Hy\cos\alpha\, dx = \frac{1}{2}\gamma HL\omega\cos\alpha \quad (6)$$

The calculation formula of the external load work $V_3$ is as follows:

$$V_3 = \int_0^L (\gamma H\cos\alpha + q)(L-x)(y')^2\sin\alpha\, dx = \frac{\omega^2\pi^2}{4}(\gamma H\cos\alpha + q) \quad (7)$$

Formulas (5)-(7) are substituted into Formula (1), and the expression for calculating the available potential function is:

$$V = V_1 - V_2 - V_3 = \quad (8)$$
$$\frac{EI\pi^6}{8L^5}\omega^4 + \frac{\pi^2}{4L}\left[\frac{4EI\pi^2}{L^2} - (\gamma H\cos\alpha + q)L\right]\omega^2 - \frac{1}{2}\omega\gamma HL\cos\alpha$$

Based on the cusp catastrophe theory, in the potential function expression (8):

$$\begin{cases} x = \left(\dfrac{EI\pi^6}{2L^5}\right)^{\frac{1}{4}}\omega \\ a = \dfrac{\pi^2}{2L}\left(\dfrac{2L^5}{EI\pi^6}\right)^{\frac{1}{2}}\left[\dfrac{4EI\pi^2}{L^2} - (\gamma H\cos\alpha + q)L\right] \\ b = -\dfrac{1}{2}\gamma HL\cos\alpha\left(\dfrac{2L^5}{EI\pi^6}\right)^{\frac{1}{4}} \end{cases} \quad (9)$$

it can be concluded that a standard form and a bifurcation set equation of the potential function of a tunnel initial support model are as follows:

$$V = \frac{1}{4}x^4 + \frac{1}{2}ax^2 + bx \quad (10)$$

$$4a^3 + 27b^2 = 0 \quad (11)$$

It can be known according to the catastrophe theory that when the control variables a and b satisfy the bifurcation set equation (11), the critical catastrophe instability if the tunnel initial support system occurs, that is:

$$\frac{\pi^6}{2L^3}\left(\frac{2L^5}{EI\pi^6}\right)^{\frac{3}{2}}\left[\frac{4EI\pi^2}{L^2} - (\gamma H\cos\alpha + q)L\right]^3 + \frac{27(\gamma HL\cos\alpha)^2}{4}\left(\frac{2L^5}{EI\pi^6}\right)^{\frac{1}{2}} = 0$$

$$\frac{4EI\pi^2}{L^2} - (\gamma H\cos\alpha + q)L \leq 0$$

which is simplified to obtain:

$$\left[\frac{EH^3\pi^2}{3L^2} - (\gamma H\cos\alpha + q)L\right]^3 + \frac{9E\gamma^2 H^5\cos^2\alpha}{16} = 0 \quad (12)$$

$$\frac{EH^3\pi^2}{3L^2} - (\gamma H\cos\alpha + q)L \leq 0 \quad (13)$$

The mechanical parameters and the design parameters of the tunnel initial support are substituted into the above formula, and the ultimate bearing capacity $q_{max}$ of the tunnel initial support is obtained.

Combined with the formula for calculating the maximum deflection of beams fixed at both ends in structural mechanics:

$$\omega = \frac{qL^4}{384EI}; \quad (14)$$

The critical deformation value $\omega_{max}$ of the tunnel initial support under the ultimate bearing capacity is obtained.

The yielding control target of the buffer layer is the relationship between a critical deformation value $\omega_{max}$ of the tunnel initial support and a maximum compression deformation amount $HD_{max}$ of the tunnel buffer layer.

The performance indexes of the buffer layer in the Step (4) include a thickness H' of the buffer layer and the maximum compression amount $HD_{max}$ of the buffer layer.

The function expression in the state of critical catastrophe instability of the tunnel initial support is calculated as follows:

(1) a total system potential energy V(x) is calculated;
(2) the bending strain energy $V_1$, the system potential energy variation $V_2$ and the external load work $V_3$ of the tunnel initial support are calculated, respectively, in which the potential function $V = V_1 - V_2 - V_3$;
(3) based on the cusp catastrophe theory, a standard form and a bifurcation set equation of the potential function of a tunnel initial support model are obtained;

(4) when a control variable satisfies the bifurcation set equation, the critical catastrophe instability of the tunnel initial support system occurs, and the function expression in the state of critical catastrophe instability of the tunnel initial support is obtained.

The calculation formula of the critical deformation value of the tunnel initial support under the ultimate bearing capacity is as follows:

$$\omega = \frac{qL^4}{384EI};$$

The yielding control target of the buffer layer is that the critical deformation value when the initial support of tunnel reaches the ultimate bearing capacity of catastrophe damage is not greater than the maximum compression deformation amount of the tunnel buffer layer, that is:

$\omega_{max} \leq HD_{max}$.

The parameters of the buffer layer are calculated, and the maximum compression amount of the buffer layer is $HD_{max}$:

$$HD_{max} = \omega_{max} \quad (18)$$

The thickness H' of the tunnel buffer layer is calculated as follows:

$$H' = \frac{\omega_{max} E'}{q_{max}};$$

where $\omega_{max}$ is a critical deformation value of the tunnel initial support under the ultimate bearing capacity, $q_{max}$ is an ultimate bearing capacity, and E' is an elasticity modulus of the buffer layer.

Embodiment 1

The expansive rock tunnel is designed as a double-hole single-track tunnel, and the main support of the tunnel uses a composite lining structure. Refer to the attached table for the section of the lining structure. Parameters of the initial support material are shown in Table 1:

TABLE 1

Table of Parameters of the Tunnel Initial Support Structure

| support material | H thickness/ cm | E elasticity modulus/ GPa | γ gravity/ kN/m³ | compressive strength/ MPa | tensile strength/ MPa |
|---|---|---|---|---|---|
| C25 sprayed concrete | 20 | 23.0 | 22 | 17 | 2.0 |

The initial support, which is intercepted as a mechanical model, is calculated to have a length L=69.9 cm and an included angle α=7.5 with the horizontal line.

(1) the ultimate bearing capacity of the tunnel initial support during critical damage is determined.

The tunnel parameters are substituted into the ultimate bearing capacity, which has the following calculation formula:

$$\left[\frac{EH^3\pi^2}{3L^2} - (\gamma H\cos\alpha + q)L\right]^3 + \frac{9E\gamma^2 H^5 \cos^2\alpha}{16} = 0$$

The ultimate load $q_{max}$ of the tunnel initial support during catastrophe damage is obtained:

$q_{max}$=12.39 Mpa;

which is substituted into the verification formula:

$$\frac{EH^3\pi^2}{3L^2} - (\gamma H\cos\alpha + q)L \leq 0$$

The formula is established. Therefore, the ultimate load $q_{max}$ is effective.

(2) the critical deformation value of the tunnel initial support under the ultimate bearing capacity is determined.

The ultimate bearing capacity $q_{max}$ is substituted into the maximum deflection calculation formula:

$$\omega = \frac{qL^4}{384EI};$$

The critical deformation value $\omega_{max}$ of the initial support of tunnel under the ultimate bearing capacity is obtained:

$\omega_{max}$=5.02 mm (3) the performance indexes and the design parameters of the tunnel buffer layer are determined.

The material of the buffer layer is polyethylene with an elasticity modulus of 300 MPa and a maximum allowable compression ratio of 5.0%.

He maximum compression amount of the buffer layer is $HD_{max}$:

$HD_{max} = \omega_{max}$=5.02 mm

The thickness H' of the tunnel buffer layer is calculated and determined:

$$H' = \frac{\omega_{max} E'}{q_{max}} = 12.15 \text{ cm}$$

To sum up, when the tunnel initial support is in the state of the ultimate bearing capacity during catastrophe damage, the critical deformation value $\omega_{max}$=5.02 mm. In order to achieve the optimal yielding design and generate economic benefits, the design parameters of the buffer layer are as follows: polyethylene material with an elasticity modulus of 300 MPa is selected as the buffer layer, which has a thickness of 12.15 cm and a maximum allowable deformation amount of 5.02 mm.

Finally, it should be noted that the above embodiments are only used to illustrate the technical scheme of the present disclosure, rather than limit the technical scheme. Although the present disclosure has been described in detail with reference to the above embodiments, those skilled in the art should understand that it is still possible to modify the technical scheme described in the above embodiments or make equivalent substitutions to some or all of the technical features. However, these modifications or substitutions do not make the essence of the corresponding technical schemes deviate from the scope of the technical schemes of various embodiments of the present disclosure, which should be included in the scope of the claims and specification of the present disclosure.

What is claimed is:

1. A method of designing and constructing a tunnel with a buffer layer having a tunnel initial support with critical deformation characteristics, the critical deformation characteristics of the tunnel initial support being a control target, wherein the method comprises the following steps:
   (1) establishing a mechanical model, obtaining a function expression in a state of critical catastrophe instability of the tunnel initial support in combination with a cusp catastrophe theory, and considering mechanical and design parameters of the tunnel initial support to obtain an ultimate bearing capacity of the tunnel initial support;
   (2) determining a critical deformation value of the tunnel initial support under the ultimate bearing capacity;
   (3) establishing a yielding control target of a tunnel buffer layer;
   (4) determining a performance index of the buffer layer according to the control target, and calculating corresponding index parameters, wherein
   the function expression in the state of critical catastrophe instability of the tunnel initial support is calculated as follows:
   1) a total system potential energy V(x) is a sum of bending strain energy $V_1$, system potential energy variation $V_2$ and external load work $V_3$ of the tunnel initial support:

$$V(x)=V_1+V_2+V_3;$$

2) the bending strain energy $V_1$, the system potential energy variation $V_2$ and the external load work $V_3$ of the tunnel initial support are calculated, respectively;
   3) the calculation relationship among the bending strain energy, the system potential energy variation and the external load work is substituted into an expression of the total system potential energy to obtain a potential function V:

$$V=V_1-V_2-V_3$$

$$=\frac{EI\pi^6}{8L^5}\omega^4 + \frac{\pi^2}{4L}\left[\frac{4EI\pi^2}{L^2} - (\gamma H \cos\alpha + q)L\right]\omega^2 - \frac{1}{2}tx\bigg)\omega\gamma HL\cos\alpha;$$

where α is an inclination angle, γ is a bulk density of tunnel initial support material, ω is a midpoint deflection of the initial support interception interval, H is a thickness of the initial support, L is a length, E is an elasticity modulus of initial support material, q is an overlying load of the tunnel, and/is a moment of inertia of an initial support section;
   4) based on the cusp catastrophe theory, a standard form and a bifurcation set equation of the potential function of a tunnel initial support model are obtained;
   5) when a control variable satisfies the bifurcation set equation, the critical catastrophe instability of the tunnel initial support occurs, and the function expression in the state of critical catastrophe instability of the tunnel initial support is obtained:

$$\left[\frac{EH^3\pi^2}{3L^2} - (\gamma H\cos\alpha + q)L\right]^3 + \frac{9E\gamma^2 H^5\cos^2\alpha}{16} = 0;$$

$$\left[\frac{EH^3\pi^2}{3L^2} - (\gamma H\cos\alpha + q)L\right] \leq 0;$$

and
   constructing the tunnel with the buffer layer in accordance with the critical deformation characteristics of the tunnel initial support as determined.

2. The design method of the buffer layer according to claim 1, wherein the Step (1) comprises:
   generalizing the tunnel in a longitudinal unit length into a linear model with the tunnel as an object;
   calculating variation of potential energy in the model.

3. The design method of the buffer layer according to claim 1, wherein the yielding control target of the buffer layer is the relationship between a critical deformation value $\omega_{max}$ of the tunnel initial support and a maximum compression deformation amount $HD_{max}$ of the tunnel buffer layer.

4. The design method of the buffer layer according to claim 1, wherein the performance indexes of the buffer layer in the Step (4) comprise a thickness H' of the buffer layer and the maximum compression amount $HD_{max}$ of the buffer layer.

5. The design method of the buffer layer according to claim 1, wherein the critical deformation value of the tunnel initial support under the ultimate bearing capacity is calculated with the following formula:

$$\omega = \frac{qL^4}{384EI};$$

where L is a length, E is an elasticity modulus of initial support material, q is an overlying load of the tunnel, and/is a moment of inertia of an initial support section;
the yielding control target of the buffer layer is that the critical deformation value when the initial support of tunnel reaches the ultimate bearing capacity of catastrophe damage is not greater than the maximum compression deformation amount of the tunnel buffer layer, that is:
$\omega_{max} \leq HD_{max}$.

6. The design method of the buffer layer according to claim 4, wherein the thickness H' of the tunnel buffer layer is calculated as follows:

$$H' = \frac{\omega_{max}E'}{q_{max}};$$

where $\omega_{max}$ is a critical deformation value of the tunnel initial support under the ultimate bearing capacity, and $q_{max}$ is an ultimate bearing capacity, and E' is an elasticity modulus of the buffer layer.

* * * * *